Aug. 25, 1970　　　G. W. WALLIN　　　3,525,912
SELECTABLE POWER SOURCE FOR A MOTOR DRIVEN APPLIANCE
Filed Nov. 22, 1966　　　10 Sheets-Sheet 1
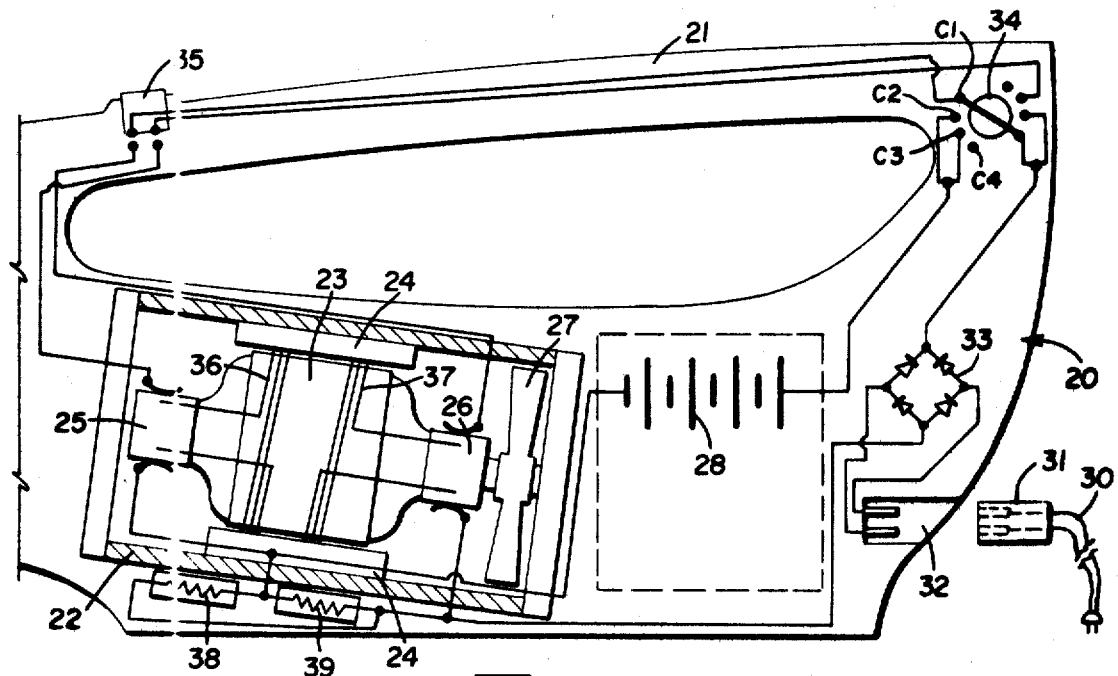
Fig_1
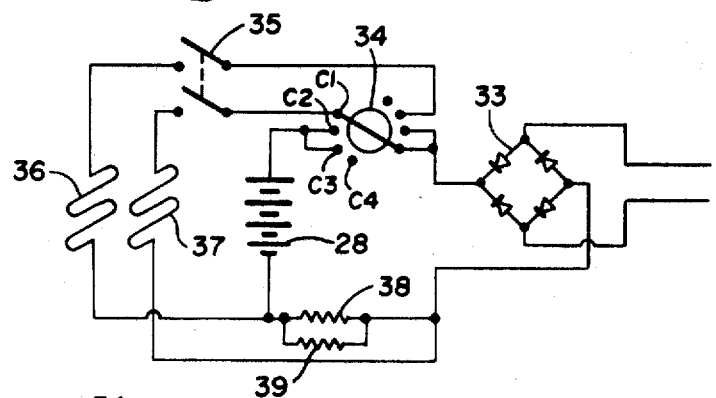
Fig_2
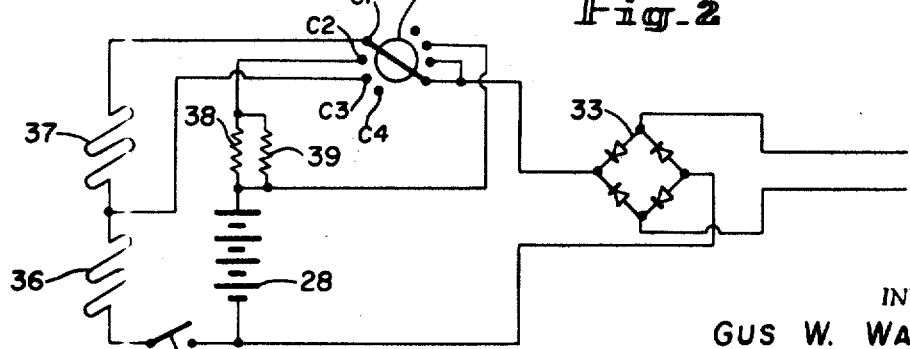
Fig_3
INVENTOR.
GUS W. WALLIN
BY Bertha L. MacGregor
ATTORNEY

INVENTOR.
GUS W. WALLIN

ATTORNEYS

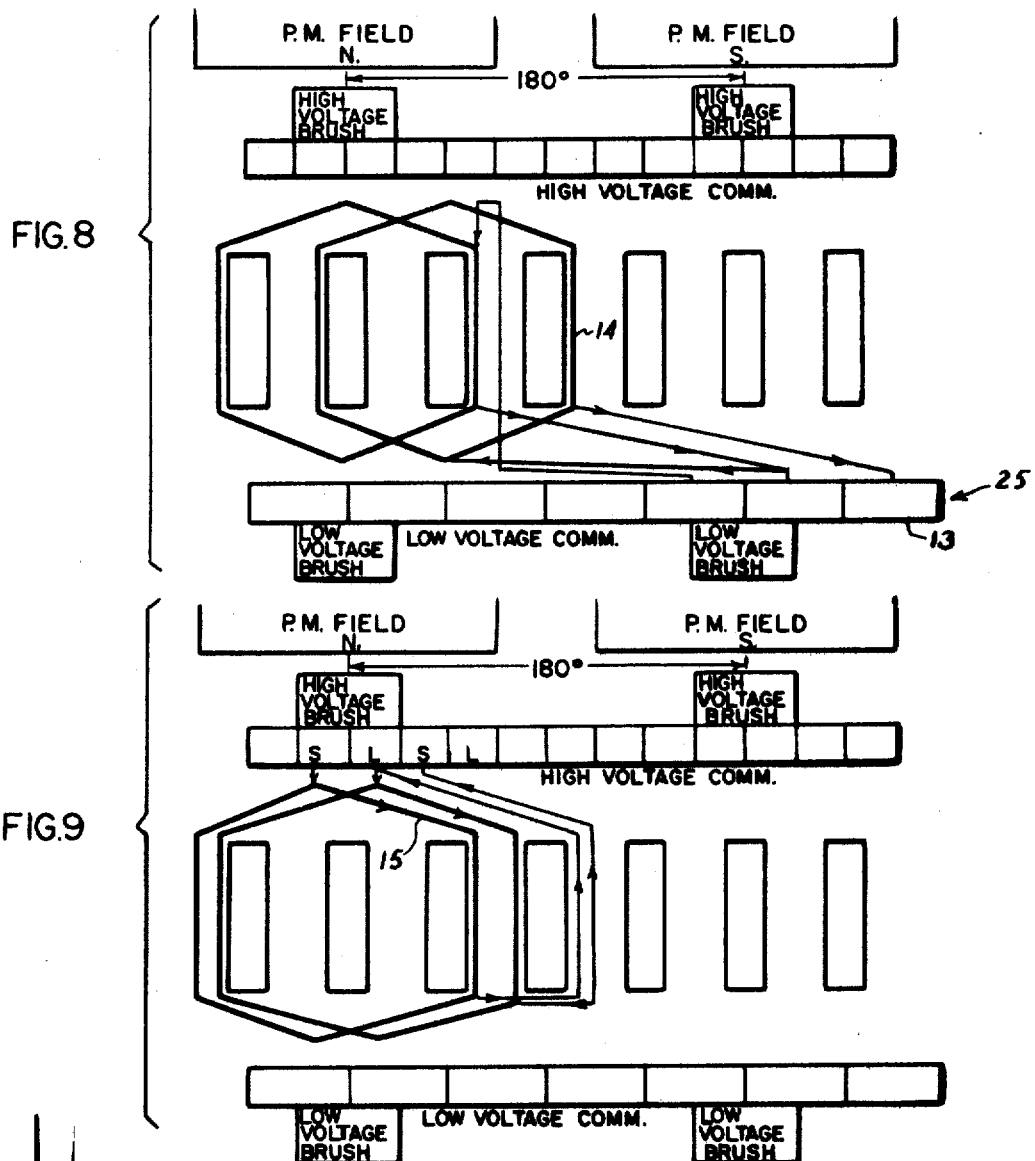
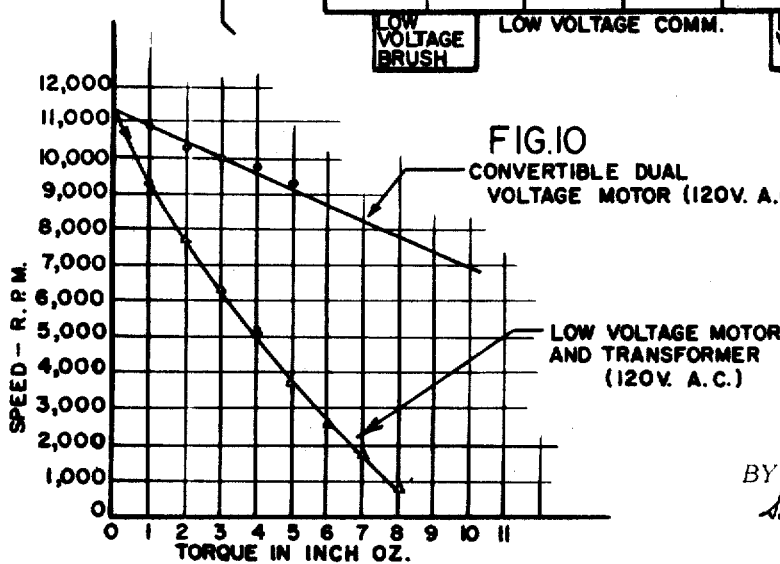

Aug. 25, 1970 G. W. WALLIN 3,525,912
SELECTABLE POWER SOURCE FOR A MOTOR DRIVEN APPLIANCE
Filed Nov. 22, 1966 10 Sheets-Sheet 6
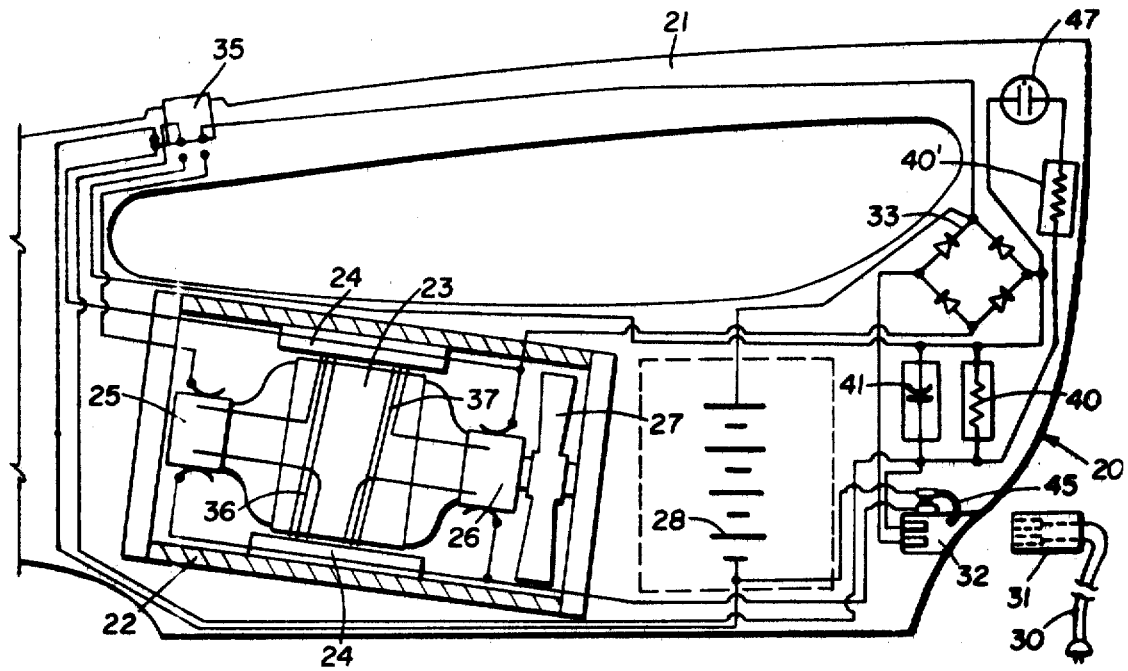
Fig_14
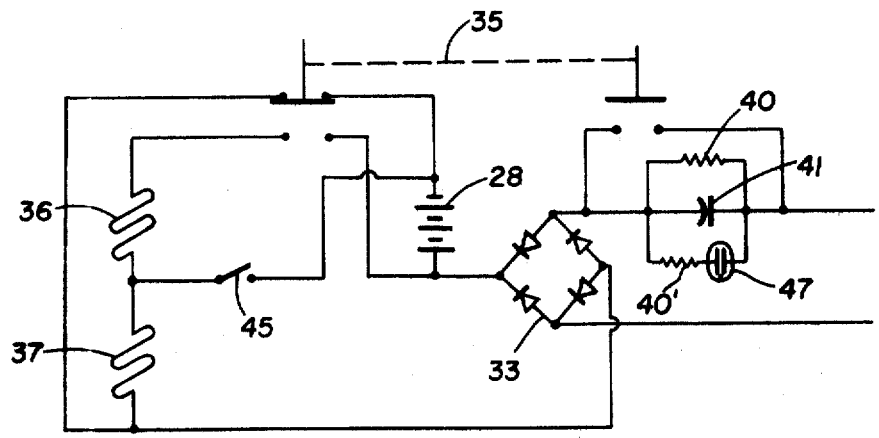
Fig_15
INVENTOR
GUS W. WALLIN
BY
Bertha L. MacGregor
ATTORNEY

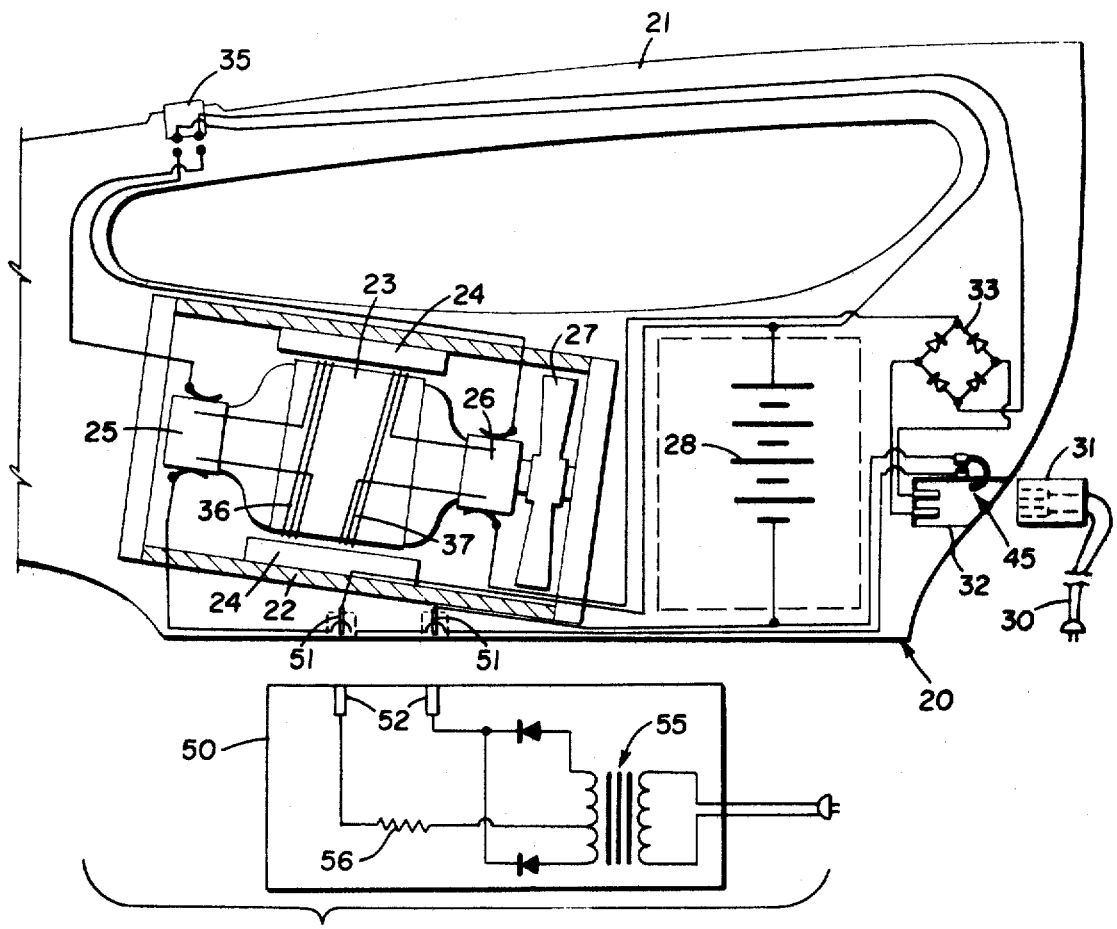
Fig. 22
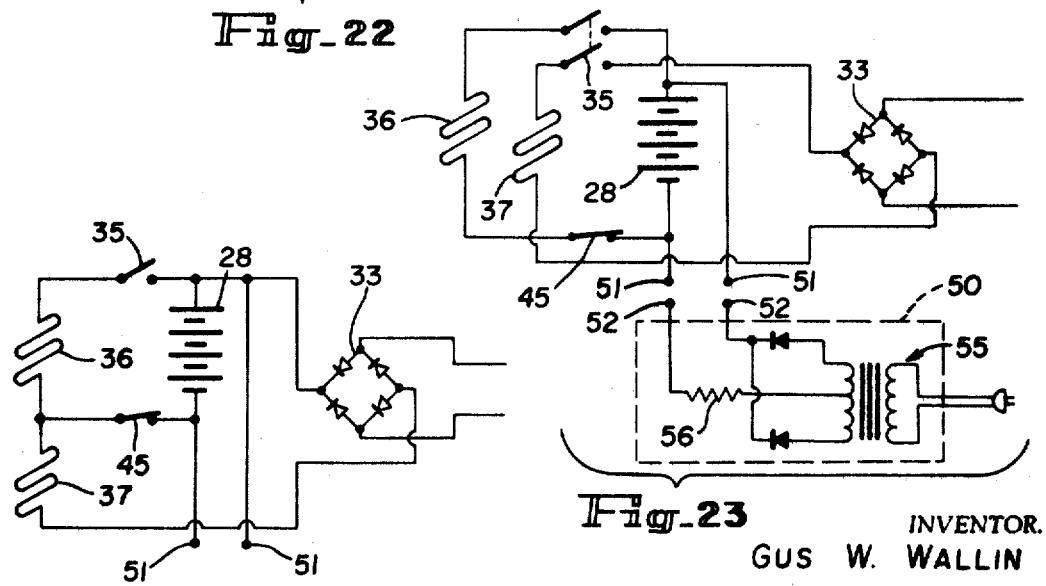
Fig. 23
Fig. 24
INVENTOR.
GUS W. WALLIN
BY
Bertha L. MacGregor
ATTORNEY

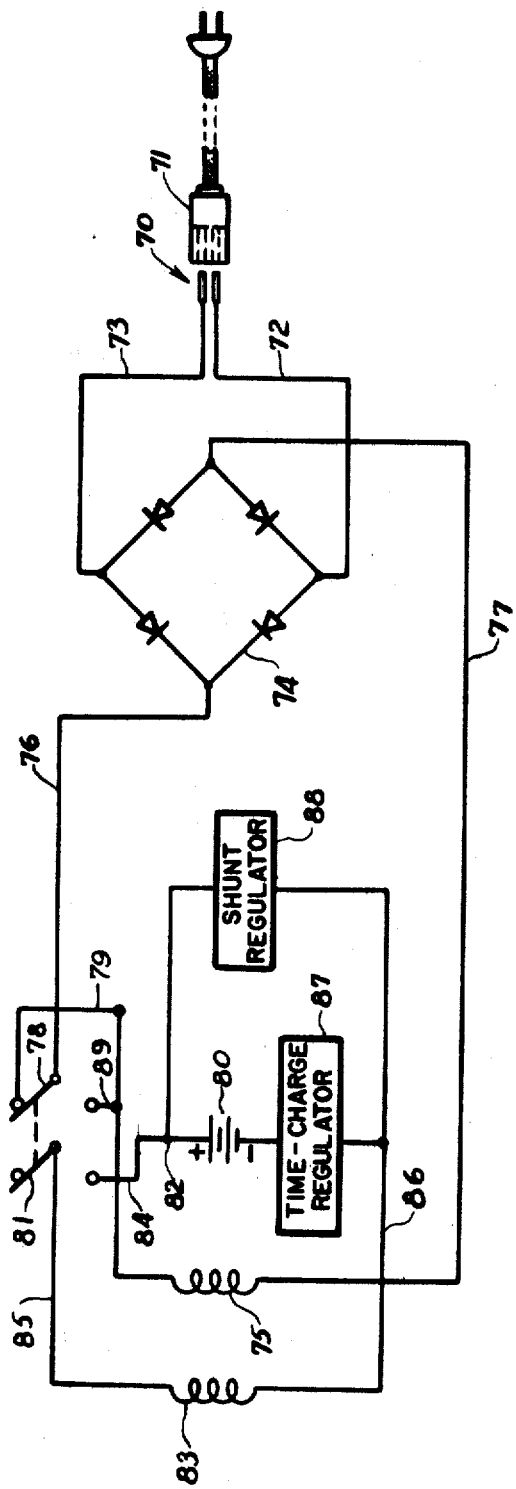

United States Patent Office 3,525,912
Patented Aug. 25, 1970

3,525,912
SELECTABLE POWER SOURCE FOR A MOTOR
DRIVEN APPLIANCE
Gus W. Wallin, Chicago, Ill., assignor to Scovill Manufacturing Company, Waterbury, Conn., a corporation of Connecticut
Continuation-in-part of application Ser. No. 537,918, Mar. 28, 1966. This application Nov. 22, 1966, Ser. No. 608,244
Int. Cl. H02k 7/14
U.S. Cl. 318—17        14 Claims

ABSTRACT OF THE DISCLOSURE

The appliance power source consists of a motor, the rotor of which is provided with two windings and two commutators. The appliance is thus operable at two significantly different voltage levels, e.g. battery and line, to provide more linear speed-torque characteristics. Circuits for appliances provide interlocks and selection circuits for specific characteristics.

---

This is a continuation-in-part of copending applications Ser. No. 537,918 filed Mar. 28, 1966 and Ser. No. 569,422 filed Aug. 1, 1966, now abandoned.

This invention relates to electric motors and associated circuitry for powering appliances and tools in which it is desirable to power the appliance or tool selectively from a power line source of conventional voltage or from a battery source of lower voltage, and in which it is desirable to recharge the battery, when necessary, from the power line source.

The invention is useful for powering many types of electrically operated appliances and tools, and particularly light weight appliances and hand tools such as electric knives, electric mixers, electric shavers, electric drills, electric saws, electric sanders and the like. Hereinafter, the term "appliance" will be understood to include all such appliances and tools.

In recent years, battery developments have reduced battery weight and bulk for a predetermined power output. As a result, in many fields, it is now feasible to energize devices driven by rotary electric motors from a battery source. Thus, many devices have been designed for battery operation from self-contained batteries in order to provide portability. The advantage of such design is that the user may employ the device at locations remote from normal electric outlets or can use the device more flexibly in the absence of cords connected to electric outlets. However, in the present state of the battery art, the weight and size of batteries necessary to provide the capacity for long term, continuous operation would be such as to limit the desired portability of the device. Normally, therefore, the battery capacity is chosen to provide the necessary energy for normal short term and/or intermittent use. For example, with a device such as an electric drill, battery capacity would be selected to provide the electrical energy necessary to run the drill for an operating interval and at a duty cycle statistically found to satisfy the needs of the majority of purchasers. Similarly, the battery capacity for other appliances is based on use and the desired physical characteristics of the appliance, such as weight and size.

In such portable appliances, it is, of course, necessary to periodically recharge the battery source. Since recharging time is long with respect to discharge time, the appliances of the prior art were often unavailable when needed. In addition, many appliances are often desirably employed from time to time under duty cycle and operating time conditions which would exceed the battery capacity.

Rather than attempt to provide a battery capacity meeting the most severe conditions of use, with the concomitant and often prohibitive increase in battery weight and size, the art has found it desirable to provide means for running the appliance directly from a line source such as a 110–120 v. outlet. With such provision, the convenience of portability is maintained and the appliance is always operable, at some restriction on portability, for severe use in terms of time or duty.

In the appliances known to the art, the capability of operation from a line source as well as from a battery source has been provided by using an electric motor designed for operation at the battery voltage (e.g. 3–6 volts). When the appliance is used on the line, the line voltage is reduced to the battery voltage level, converted to a unidirectional voltage and applied to the motor. One common approach is to provide a transformer to step down the line voltage to the battery voltage. The transformer is sometimes carried in the appliance. However, since the transformer is often heavy, in most applications, the transformer has been mounted in a separate housing, such as base or stand for the appliance. Such arrangements require two cords, one from the outlet to the stand and another from stand to appliance.

Alternatively, the art has employed arrangements in which the line voltage is rectified and applied to the motor through a dropping resistor. Since the usual line voltage is of the order of 110 volts and the usual battery voltage is of the order of 3–6 volts, it can be seen that the majority of the power used in the appliance is wastefully dissipated in the dropping resistor which leads both to inefficiency and excessive heating of the appliance.

In those appliances where a transformer is utilized to drop the line voltage to the voltage level of the battery supply, other drawbacks are encountered. The transformer itself is both expensive and heavy. Thus, in addition to the expense of the transformer itself, the weight and cost of the appliance is increased in providing the structural strength for mounting of the transformer.

Furthermore, because of the introduction of the transformer in the operating circuitry, it is difficult to maintain the motor torque at the desired level over the operating speed range of the motor. The transformer circuitry introduces significant voltage drops with increased motor load, which adversely affects the speed torque characteristics of the motor.

It is, therefore, an object of the present invention to provide a motor construction capable of operation at at least two distinct electrical sources of greatly different voltage and means for selectively applying such different sources to said motor.

It is a further object of this invention to provide an improved appliance motor and associated circuitry for selectively energizing the appliance from line or battery source of significantly different voltages.

It is another object of this invention to provide improved circuit arrangements for appliances operable from line or battery selectively in which switching is simplified, production cost is reduced as compared to circuits heretofore known, and efficiency for its intended purpose is increased.

In accordance with these objects, there is provided, in a preferred embodiment of this invention, a motor having an armature and stator. The armature is provided with a central shaft and is mounted within said stator for rotation therein on said shaft. A plurality of stamped laminations are assembled on said shaft and define a plurality of substantially axially extending slots to receive the armature windings. A first and second commutator is provided on the motor shaft. Two windings are wound on the lamination stack, the first winding of which is a low voltage winding having the coils thereof coupled to the low voltage commutator. The second winding is a high voltage winding applied over the low voltage windings in the lamination stack and the coils of which are coupled to the high voltage commutator.

The stator is provided with magnetic poles. In most applications, the stator magnetic poles are constructed of permanent magnets to provide a permanent magnetic field without external energizing. However, in some applications, it is found desirable to provide separately energized stator pole windings. If the stator is provided with pole windings, each stator pole is provided with a low voltage and high voltage winding to provide the desired magnetic flux with each applied voltage.

Several different diagrams of the motor and associated circuitry are shown and described for use in appliances. The circuit arrangements are selected for various operating characteristics.

Having briefly described this invention, it will be described in greater detail along with other objects and advantages, in the following detailed portions of the specification, which may best be understood by reference to the accompanying drawings, of which:

FIG. 1 is an elevational side view, partly in section and diagrammatic, of a portion of a power operated knife embodying my invention, showing the circuit wiring superimposed on the knife structure, and a line cord which may be either detachable or permanently attached to the knife.

FIG. 2 is a diagram of the circuit of FIG. 1.

FIG. 3 is a diagram showing a modification of the circuit of FIGS. 1 and 2, wherein both the 120 volt and the 5 volt motor windings are energized at 120 volt operation, and batteries are charging while the motor is operating on 120 volt AC.

Figure 4:
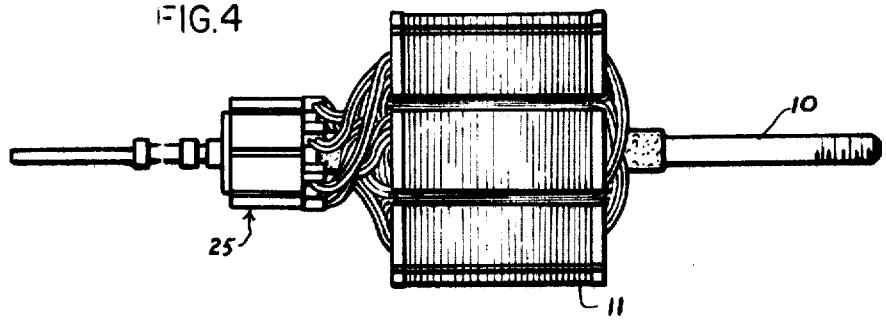

FIG. 4 is an elevation view of the armature of the motor shown in FIG. 1 with the low voltage winding thereon.

Figure 5:
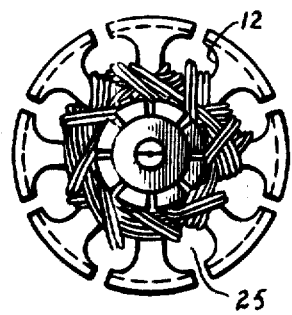

FIG. 5 is an end view of the armature of FIG. 4.

Figure 6:
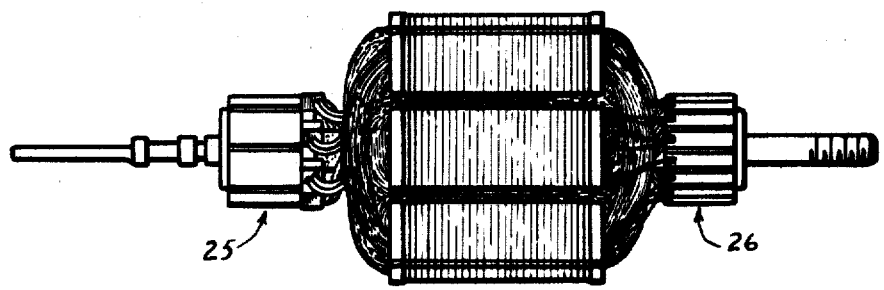

FIG. 6 is an elevation view of the armature of FIG. 4 with the low and high voltage winding thereon.

Figure 7:
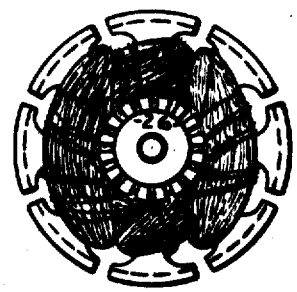

FIG. 7 is an end view of the armature shown in FIG. 6.

FIG. 8 is a winding diagram for the low voltage winding of FIG. 4.

FIG. 9 is a winding diagram for the high voltage winding of FIG. 5.

FIG. 10 is a plot of torque vs. speed showing a comparison of the arrangement of this invention in contrast with a prior art arrangement.

Figure 11:
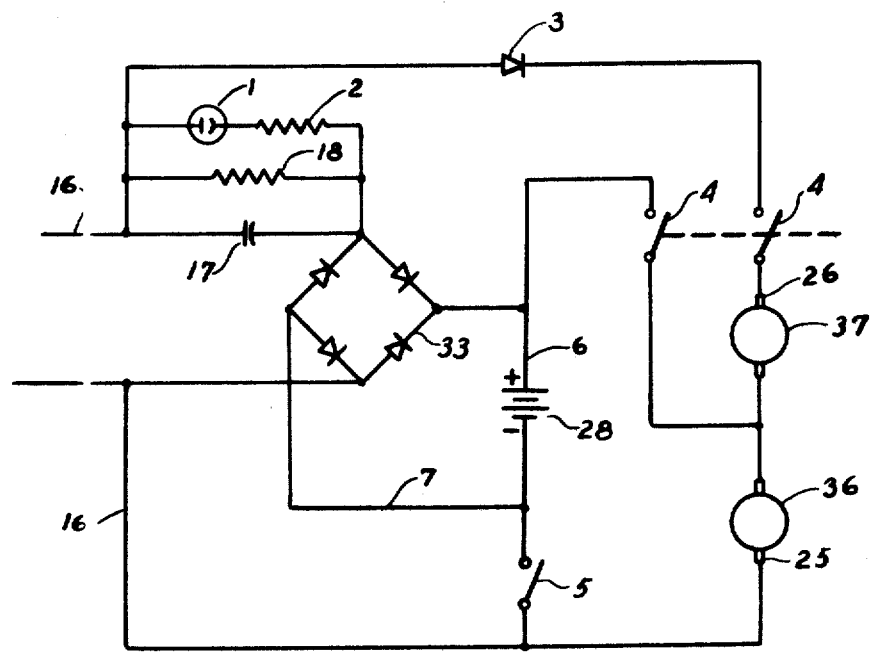

FIG. 11 is a schematic diagram of a motor and associated circuitry useful in appliances.

Figure 12:
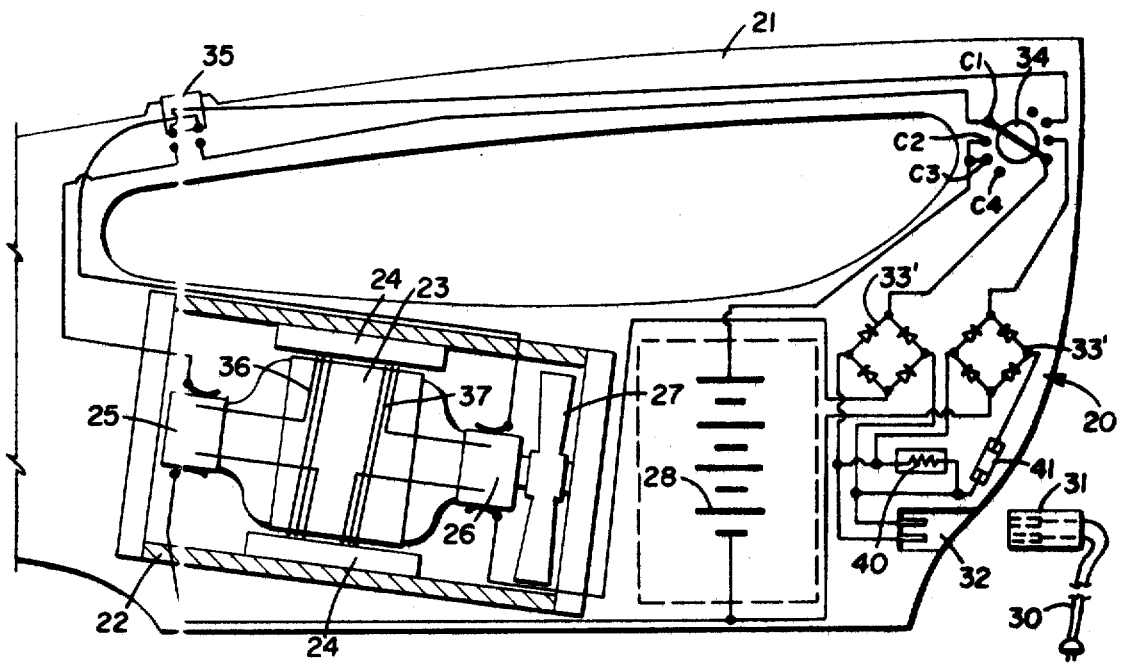

FIG. 12 is a view similar to FIG. 1, of a portion of a power operated knife embodying the invention, in which the circuit includes a capacitor and resistor instead of resistors only, and two full wave rectifiers in place of the one shown in FIG. 1. Like FIG. 1, the line cord and plug may be detachable or permanently attached.

Figure 13:
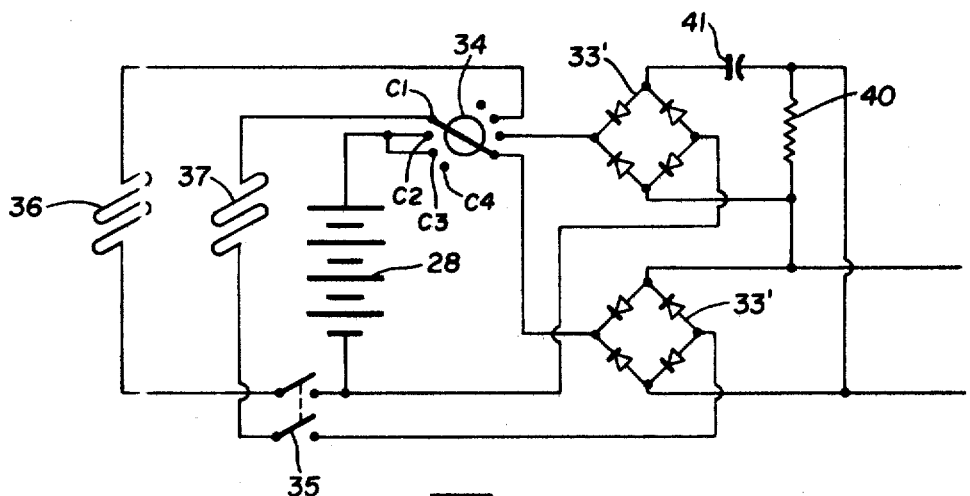

FIG. 13 is a diagram of the circuit of FIG. 12.

FIG. 14 is a view similar to FIG. 1 of a portion of a power operated knife embodying the invention, in which the circuit includes a capacitor, and may include a resistor which allows a path for the capacitor to discharge when the line cord is removed, eliminating a shock hazard if the terminals were touched. In this embodiment 120 volt operation occurs when the on-off switch is in the on position and line cord is in the knife; battery charging occurs when on-off switch is in the off position and line cord is in the knife; and battery operation occurs when the on-off switch is in the on position and the line cord is removed from the knife.

FIG. 15 is a diagram of the circuit of FIG. 14.

Figure 16:
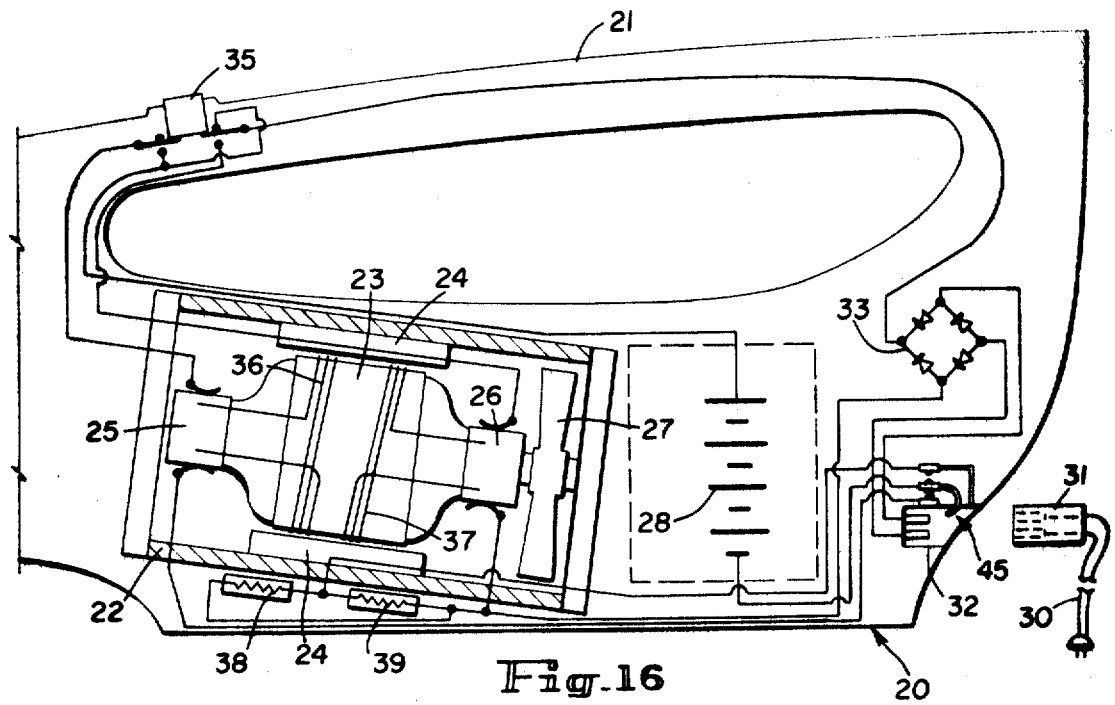

FIG. 16 is a view similar to FIG. 1, showing another modification of the invention, in which the line cord must be detached before the knife can be battery operated. This circuit eliminates the need for a selector switch shown in other embodiments.

Figure 17:
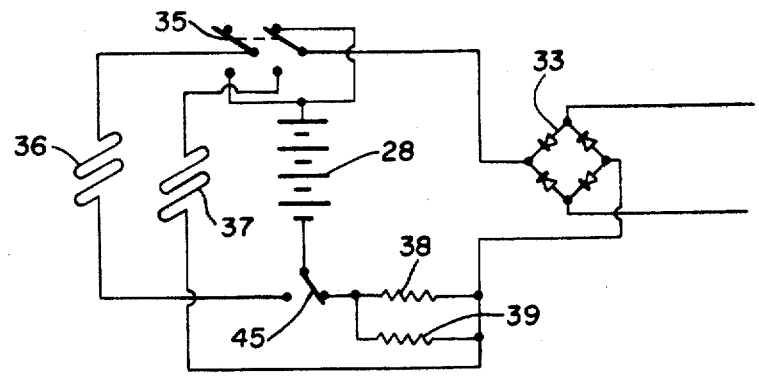

FIG. 17 is a diagram of the circuit of FIG. 16.

Figure 18:
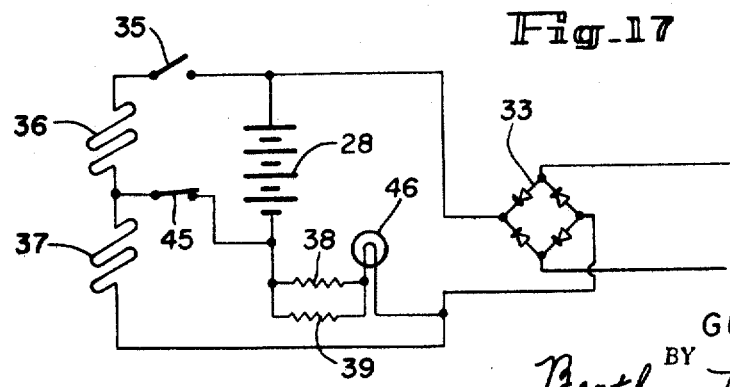

FIG. 18 is a diagram showing a modification of the circuit of FIGS. 16 and 17, wherein both the 120 volt and the 5 volt windings are energized at 120 volt operation, and batteries are charging while the knife is running on 120 volt AC current.

Figure 19:
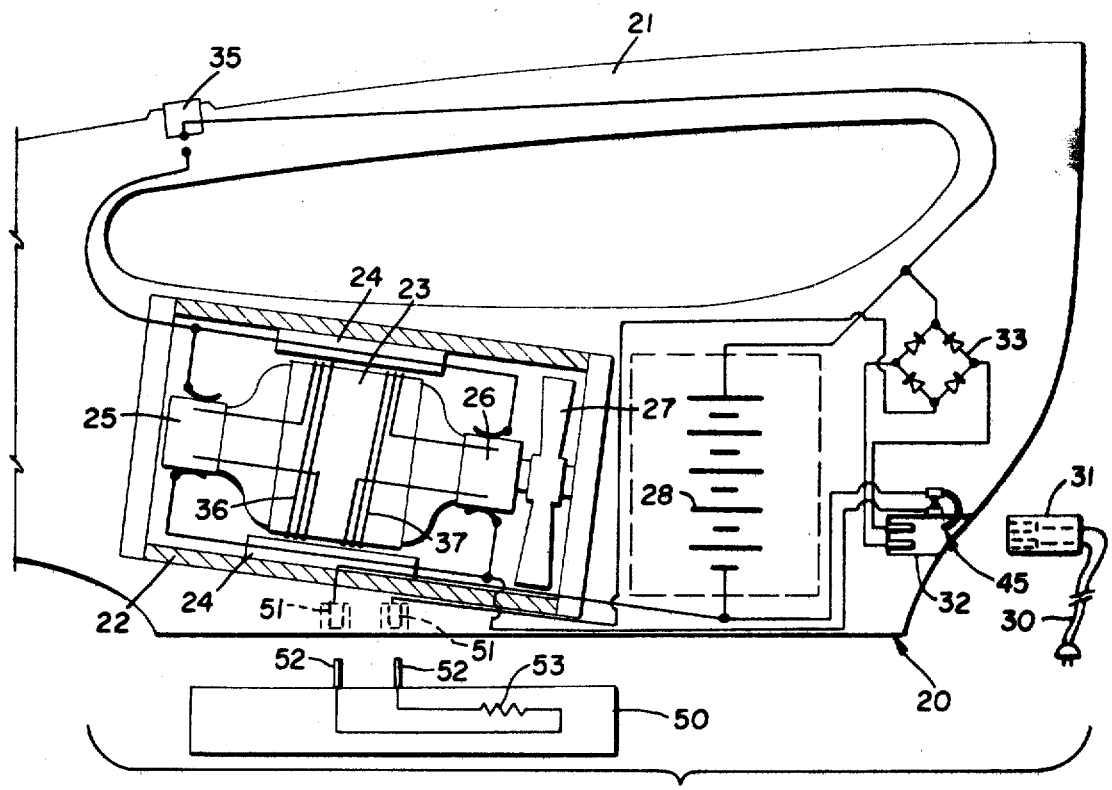

FIG. 19 is a view similar to FIG. 1, showing another modification of the invention, in which the line cord must be detached before the knife can be battery operated. This circuit eliminates the need for a selector switch, but a charging contacts located in the knife are recessed in order to prevent shock.

Figure 20:
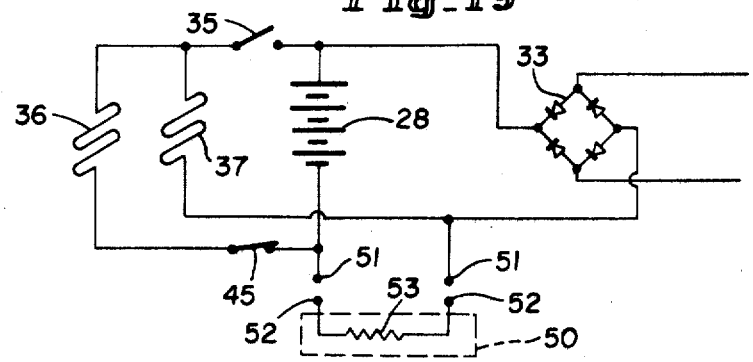

FIG. 20 is a diagram of the circuit of FIG. 19.

Figure 21:
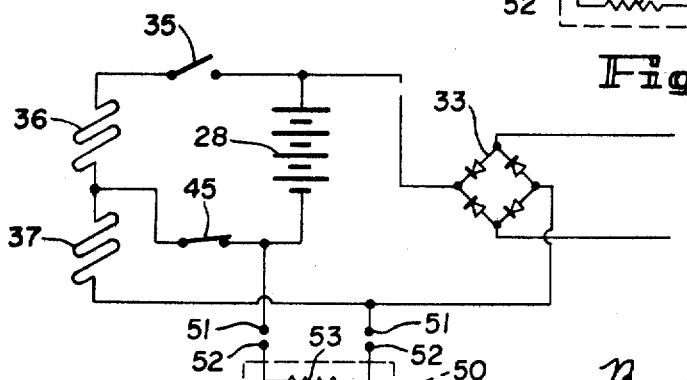

FIG. 21 is a diagram showing a modification of the circuit of FIGS. 19 and 20, wherein both the 120 volt and the 5 volt windings are energized at 120 volt operation.

FIG. 22 is a view similar to FIG. 1, showing a modification of the invention as shown in FIG. 19, but employing a battery charging transformer in the charging stand instead of the resistor of FIG. 19.

FIG. 23 is a diagram showing the circuit of FIG. 22.

FIG. 24 is a diagram showing a modification of the circuit of FIGS. 22 and 23, wherein both the 120 volt and the 5 volt windings are energized at 120 volt operation. A charging stand such as shown in FIGS. 22 and 23 also is used in this circuit.

FIG. 25 is a schematic diagram of a circuit capable of fast charging of the batteries.

The invention will be described as embodied in a power operated knife which includes a handle housing 20 provided with a hand grip portion 21. A motor housing 22 supports the armature 23, field magnets 24, low voltage commutator 25, high voltage commutator 26, and fan 27. A battery pack 27 is located adjacent the motor housing 22 in the knife housing 20.

As shown in FIGS. 1–3, a line cord 30 provided with plug 31 may be detachable from the terminal receptacle 32 or permanently attached to the knife circuit to provide 120 volt AC current. The circuit includes a full wave rectifier 33, selector switch 34, on-off switch 35, preferably located on the hand grip portion 21, low voltage commutator 25 and low voltage winding 36, high voltage commutator 26 and high voltage winding 37, and two metal clad resistors 38, 39. The resistors are chosen so as to limit the charging current to a predetermined value. The selector switch is a four position switch in which contact C–1 provides for 120 volt operation, C–2 for battery charging, C–3 for battery operation, and C–4 for "off" switch opening.

The low voltage armature winding 36 consists of seven turns of No. 23 wire and the high voltage winding 37 consists of eighty turns of No. 35 wire. Obviously, the number of turns and the cross sectional dimensions of the windings may vary, but the example stated has been found suitable for motor operation powered selectively by approximately 5 volt batteries or by a 120 volt rectified AC power source.

The resistors 38, 39, preferably are Allen Bradley metal clad resistors, mounted on the motor housing 22 which serves as a heat sink. Equivalent resistors, other than Allen Bradley, may be used for the charging circuit, and the number of resistors may vary, depending on wattage rating of the resistors, and the rating due to temperature conditions and space between resistors.

In the embodiment of the invention shown in FIGS. 1–3, the knife is self-contained, does not require a battery charging stand, and does not need a switch located at the line cord receptacle 32. The line cord 30 may be detachable or permanently attached to the knife. The circuit shown in FIG. 3 differs from the one shown in FIG. 2 in that connections have been changed so that both the 120 volt and the 5 volt motor windings are energized at 120 volt operation. In the circuit of FIG. 3, a single pole on-off switch 35 may be used in place of the double pole switch 35 of FIG. 2. Batteries are being charged only when the switch is in the battery-charging position, C2.

The construction of the motor shown in FIG. 1 is best shown in FIGS. 4–9. The stator is a two-pole stator using permanent magnets 24 to establish the magnetic field and is not illustrated in detail.

The rotor comprises a central shaft 10 on which is pressed a plurality of laminations 11 shaped to provide a plurality of substantially axially extending slots 12. The slots may, of course, be skewed, if desired. A low voltage commutator 25 is also assembled on the shaft 10. Low voltage armature coils 14 are then wound on the armature by winding relatively heavy insulated wire. A typical forming diagram is shown in FIG. 8 which shows the armature in developed form, the coil placement, the couplings to the segments 13 of the low voltage commutator 25 and the pole pitch. The low voltage winding is in this embodiment developed as a progressive lap winding although other winding types may be used. The high voltage commutator 26 is then assembled on the shaft and the high voltage winding applied to the armature coil. The high voltage winding is wound in the same coil slots as the low voltage winding and over the low voltage winding as is shown in FIGS. 6 and 7. The high voltage winding is constructed of finer wire for increased impedance to the higher voltage applied thereto. Normally, the high voltage commutator will be provided with an increased number of commutator bars to maintain interbar voltage within acceptable limits. The high voltage armature coils 15 are applied as shown in the developed armature diagram of FIG. 9.

With a stator employing permanent magnets, the stator field is, of course, established substantially independent of the voltage applied to the rotor. Thus, for operation, it is only necessary to provide a switching circuit to apply low voltage as, for example, from a self-contained battery source or the line voltage to the proper winding for the operation of the motor at the selected voltage level, as illustrated and explained in connection with FIGS. 1–3. Interlock means to prevent simultaneous application of both voltages to the respective windings are provided, also as illustrated and explained in connection with FIGS. 1–3.

As described, the motor is a shunt motor and exhibits a substantially linear torque speed curve on both high voltage and low voltage operation as would be anticipated from the shunt motor design.

The arrangement disclosed has many advantages over those arrangements known to the prior art. The increased weight and diameter of the motor required for the added winding (when compared to a low voltage motor) is very low particularly when compared with the weight and bulk of a transformer required by the prior art arrangements.

The operating effectiveness is greatly improved over the prior art arrangement of using a low voltage motor and driving transformer. A comparison of the torque speed curves of the two arrangements is shown in FIG. 10.

In FIG. 10, there is shown the speed-torque curves exhibited by the motor of the instant invention as compared with the speed torque curve of a motor energized from a transformer when operating off line voltage. As will be noted from this figure, the speed-torque response of the transformer powered motor has a much steeper slope due to the effect of the impedance drop in the transformer. From this, it can be seen that the motor of the instant invention provides far more desirable operating characteristics. The fabrication costs of this motor is far less than the cost of a low voltage motor and associated transformer for operation at line voltages.

In illustrating a fractional horsepower appliance motor, a permanent magnetic field arrangement has been illustrated because of the advantages of such construction with existing permanent magnets. However, a motor constructed in accordance with the present invention is also well adapted for use with a separately energized field pole. To be operable at different supply voltage levels, dual field windings must be provided for the different voltage levels in order to generate the same magnetic field flux at each selected operating voltage level. In many applications, the use of permanent magnet stators offers constructional simplicity and economy in fabrication. However, in the fractional horsepower field, it is often desirable to employ a wound stator for various effects, such as reversal of rotation of the drive motor with change of voltage level or to provide specific operating characteristics dictated by the application intended.

A convenient circuit arrangement for use with the dual winding motor explained above and which has certain operating advantages in some applications is shown in FIG. 11.

In FIG. 11, there is shown an electrical circuit which does not require a selector switch for controlling the 120 volt operation, battery charging, battery operation and on-off switch. Only two switches are needed, one for the motor on-off control and the other for battery operation. Battery charging takes place as long as the AC power line cord is connected to the high voltage source whether the motor is running or not. An indicator lamp 1 is provided to indicate battery charging.

The circuit shown in the drawing includes the external source high voltage power line 16, a condenser 17 which drops voltage from 120 volts to 3.6 volts, a resistor 18 for leaking residual charge, a neon bulb 1 and a resistor 2 connected across the capacitor 17 to visually indicate battery charging. Also connected in the line is a half wave rectifier 3, on-off switch 4, high voltage winding 37, high voltage commutator 26, a low voltage winding 36 and low voltage commutator 25. The switch 5 is an interlock switch, opened when the line cord is plugged into the appliance. Thus, selection of the mode of operation, battery or line, is automatically determined by plugging a line cord into the appliance receptacle. Also in circuit is the battery or batteries 28, and a full wave rectifier 33. The full wave rectifier 33 is a low cost Selenium rectifier, connected by lines 6 and 7 to opposite sides of the battery 28.

The low voltage winding 36 consists of six turns of No. 22 wire and the high voltage winding 37 consists of eighty turns of No. 35 wire, but the number of turns and the cross sectional dimensions of the windings may vary. The example stated has been found suitable for motor operation poweded selectively by approximately 3.6 volt batteries or by a 120 volt rectified AC power source.

The circuit of FIG. 11 is useful in many appliances since mode selection is automatic with insertion of the line cord. On line operation, battery charging is continuous whether the motor is running or not to assist in maintaining full battery charge.

Referding to FIGS. 12 and 13, the invention is embodied in a power operated knife such as heretofore described, the parts again being designated by numerals 20–38, as in FIG. 1. The circuit also includes the line cord 30, plug 31, terminal receptacle 32, and four position selector switch 34.

Instead of a single full wave rectifier 33, it is preferred to employ two such rectifiers, 33′, and in place of resistors 38, 39, I have used in this embodiment a resistor 40 and a capacitor 41. The capacitor is of a value chosen to limit the charging current to a predetermined value. The use of a capacitor in charging the batteries eliminates the heat that would be produced by a resistor in this embodiment. The resistor 40 allows a path for the capacitor to discharge when the line cord is disconnected. This eliminates a shock hazard that would occur when the terminals were exposed. The circuit includes the low voltage armature winding 36 and the high voltage winding 37 heretofore described.

In the embodiment shown in FIGS. 12, 13 the knife is self-contained, does not require a battery charging stand and does not need a switch at the line cord receptacle 32. The line cord 30 may be detachable or permanently attached to the knife.

The circuits of FIGS. 12, 13 also permit battery operation of the knife with the cord attached or detached from the knife. The batteries charge only when the switch 34 is in the battery charging position C2.

Referring to FIGS. 14 and 15, the invention is embodied in a knife such as heretofore shown in FIG. 1, the parts again being designated 20–28. A line cord 30, plug 31, terminal receptacle 32 and rectifier 33 are included. The selector switch 34 has been omitted. The armature windings 36, 37 are constructed as heretofore described. A resistor 40 allows a path for a capacitor 41 to discharge when the line cord 30 is removed, eliminating a shock hazard if the terminals were touched. It may be eliminated if the shock hazard is not considered a factor. The capacitor 41 is of a value chosen to limit charging current to predetermined value. A neon bulb 47 indicates that batteries are charging; its use is optional. A filamentary type bulb may also be used although connections would have to be changed. A resistor 40' limits current through the neon bulb. In this embodiment, 120 volt operation occurs when the on-off switch 35 is in the on position and line cord is in the knife; battery charging occurs when the on-off switch is in the off position and line cord is in the knife; and battery operation occurs when the on-off switch is in the on position and the line cord is removed from the knife. The single pole, single throw normally closed switch 45 opens when the cord 30 is plugged in to prevent battery from energizing 5 volt winding at the same time the 120 volt winding is energized by power line.

Referring to FIGS. 16–18, the invention is embodied in the type of knife heretofore shown in FIG. 1, the parts again being designated by numerals 20–28. As before, a line cord 30, plug 31 and terminal receptacle 32 are included. The selector switch 34 has been omitted because all the functions are performed automatically. The armature windings 36, 37 are constructed as heretofore described. Resistors, preferably Allen Bradley metalclad resistors 38, 39 are mounted on the motor housing which serves as a heat sink, but others may be used. In this embodiment, the line cord 30 must be detached from the knife before the knife can be battery-operated. If a permanently attached cord were used, a selector switch would be required. The double pole double thrown on-off switch 35 of FIGS. 16 and 17 is shown in the "off" position, and with the cord 30 plugged into the knife, the batteries are charging. When the switch is in the "on" position, batteries are not charging but the knife is operating at 120 volts AC.

This circuit requires a switch to be located at the line cord receptacle 32. The switch 45 in FIGS. 16 and 17 is a single pole, double throw switch, shown with the cord 30 removed from the knife in order to permit battery operation. When the plug 31 is inserted in the knife, the switch 45 is thrown to a position that enables the batteries to charge as long as the on-off switch 35 is in the off position.

In FIG. 18, the wiring connections have been altered so that both the 120 volt and the 5 volt motor windings are energized at the 120 volt operation. The normally closed switch 45 opens when plug 31 is inserted, and with the high and low windings energized simultaneously, batteries are being charged whenever the line cord is connected to the source of power, both when motor is running on 120 volt AC or not running by opening of on-off switch 35.

The circuits of FIGS. 16 and 17 permit battery charging only when the on-off switch 35 is in "off" position, whereas the circuit of FIG. 18 permits charging of batteries both when the on-off switch 35 is in either "on" or "off" position. The circuit of FIG. 18 is preferred over that of FIG. 17 because it is the simplest and least expensive circuit, providing all circuitry within the housing 20. Batteries are being charged both when the switch 35 is in either "on" or "off" position as long as the AC cord is plugged into the 120 volt AC receptacle 32.

The filamentary type bulb 46 indicates the batteries are charging. Its use as a charging indicator is optional. A neon gas type bulb may be used in this and other circuits shown.

Referring to FIGS. 19–21, the invention is embodied in a power operated knife such as heretofore described and shown. Corresponding parts are similarly designated. The selector switch 34 heretofore described has been omitted and a charging stand 50 included. The on-off switch 35 in this embodiment is a single pole single throw switch. The line cord 30 must be detached before the knife can be battery-operated. If the cord were permanently attached, a selector switch would be required. Battery charging contacts 51, located in recesses in the housing 20, make contact with the charging circuit contacts 52. A resistor 53 is connected in the charging circuits.

The switch 45 is normally closed. When the line cord 30 is inserted into the knife, the switch 45 is opened to prevent the low voltage winding from being energized by the batteries when the plug 31 is in the knife and the on-off switch 35 is in on position. It also blocks the current from passing through the batteries, through the low voltage winding at reverse polarity and through the high voltage winding.

The circuit of FIG. 21 is the same as that shown in FIGS. 19 and 20 excepting that the connections have been altered so that both the 120 volt and the 5 volt windings are energized at 120 volt operation.

Referring to FIGS. 22–24, the embodiments shown is similar to that of FIGS. 19–21, excepting that a transformer 55 has been substituted for the resistor 53 in the charging stand 50. A resistor 56 may be included in the charging circuit. The circuit shown in FIG. 24 is the same as the one shown in FIGS. 22 and 23 except for the alteration in connections, and the charging stand 50 has been omitted although a similar stand is required for this embodiment.

The transformer 55 is a small relatively inexpensive transformer, needed only for battery charging, and is not the heavy inexpensive transformer heretofore used in the convertible power knife produced by applicant's assignee, in which the transformer had the dual function of transforming the power line high voltage to the 5.2 volts, at which the prior art motors were designed to operate, in addition to the function of battery charging.

In the embodiment of FIGS. 22–24, charging of the batteries occurs only when the knife is properly positioned on the charging stand.

The circuits shown herein can be modified if desired to use a permanently attached cord by using a "battery or 120 volt AC" selector switch.

A single diode may be used in place of the full wave rectifier shown in FIGS. 1–3 and 16–24. It may also replace the full wave rectifier 33' which has 120 volts AC across its input terminals, and whose output terminals are connected to the switch 35 and position C4 of switch 34. The transformer used in FIGS. 22–24 may also use a single diode. In these cases, a large capacity capacitor such as an electrolytic may be used with the single diode to increase the power delivered. A single diode may not be used in the circuits of FIGS. 14 and 15, or in place of the full wave rectifier 33' that has capacitor 41 connected to one of its input terminals.

In the embodiments illustrated in the preceding descriptions, the provision has been made for low amperage charging of the batteries. In some applications, however, as, for example, lawn mowers utilizing the rotary power source of the present invention, it is desirable to provide means for fast charging of the batteries.

The high capacitor nickel-cadmium cells commonly used in applications employing the instant invention may be "fast" charged by using a high amperage input coupled with suitable protective circuitry to prevent battery damage. In applications such as lawn mowers, it is quite often desirable to provide the capabilities of fast charging of the batteries for user convenience and to eliminate the need for long term charging.

To provide a high amperage input, for example, of the order of 20 and 30 amps by transformer would necessitate a transformer which is both very heavy and quite expensive. In addition, of course, the requirement for rectification of high amperage currents involves the use of large high capacity rectifiers which are similarly expensive.

In FIG. 25, there is shown an installation which is suitable for use in such applications and consists of a power receptacle 70 to receive the plug 71 of a line cord coupled to a line output. The line power applied over leads 72, 73 is rectified by the full wave rectifier 74 and applied to the high voltage winding 75 of the dual wound motor via leads 76, 77, switch blade 78 and lead 89. The switch blade 78 is the on-off switch controlled by the user to run the appliance. A battery pack 80 is provided. A second switch blade 81 is mechanically ganged from switch blade 78 and when the on-off switch is thrown to the down position opposite that shown in FIG. 25, connects the positive terminal 82 of the battery to the top of the low voltage winding 83 via leads 84 and 85. The other side of the low voltage winding is connected to the negative terminal of the battery through lead 86 and a time charge regulator 87. A shunt regulator 88 is coupled across the series combination of the battery and the time charge regulator.

Then, when operating on the line, the high voltage winding is energized from the line. The low voltage winding is driven through the magnetic field to provide a generator action generating sufficient voltage for battery charging at a high amperage rate. In the embodiment illustrated, the appliance will be driven. Should the appliance be of such nature as to require high power inputs for load handling capacity alone, it may be desirable to mechanically uncouple the driven elements during charging. Thus, for example, the lawn mower blades may be uncoupled when it is desired to charge the batteries by typical clutch arrangements known to the art.

The charging current generated by the low voltage winding 83 must be controlled to prevent excessive charging and, thus, destruction of the battery 80. The time charge regulator 87 performs this function. The time charge regulator comprises a coulometer cell which integrates the charging current with time and imposes a series resistance which will limit the time-charged integral to a predetermined maximum dictated by the capabilities of the battery. A shunt regulator 88 limits the applied voltage and consists of a zener diode, the avalance effect of which is utilized for voltage limitation.

In the circuit shown in FIG. 25, battery operation is performed merely by disconnecting the line plug 71 and energizing ganged switches 78, 81. When so energized in the down position opposite that shown in FIG. 25, the battery is coupled across the low voltage winding 83 to drive the winding. Since the back EMF of the rotating motor limits the current into the low voltage winding 83, the time charge regulator 87 does not operate as an active circuit element and current flow from the battery is not limited by the regulator. Should the coulometer cell tend to operate, a shunt circuit can bypass the cell. The shunt is easily applied because of the reversal of current direction by changing from battery charging to running.

When the switch is in the position shown in FIG. 25 and the line cord is plugged in, the high voltage armature winding will be operative.

The external power sources referred to in the first paragraph of this specification may include conventional AC current supplying power lines, which in the United States commonly supply 110–120 volts AC and in European countries 220 volts AC; and storage batteries of different voltages, which, for example, may be conventional 12 volt automobile batteries, 24 volt aircraft batteries, and other. The high voltage power may be AC rectified or DC battery-derived. The number and size of batteries employed for providing the external power source may vary. "Power line" as used herein is a line which may lead from any external power source.

Another variation is the provision of a third winding and commutator to augment the two described herein. A third winding may be designed for whatever voltage is needed to match the external power source with which it is intended to be used. Any number of windings, together with commutators connected thereo, in circuit, may be provided. Such third, and additional windings may be AC rectified or battery—DC.

A wide range of circuit arrangements is available for the functioning of appliances without departing from the invention as defined by the appended claims. It is to be understood that the word "knife" or "tool" or "appliance" in the claims is intended to include knives, tools, and other motor appliances optionally powered by either batteries or other electrical current source. In devices of the character mentioned, it is desirable to achieve comparable speed torque characteristics whether employing 120 volt AC or 5 volt DC. This result has been accomplished by the invention described herein without using a stepdown transformer such as has heretofore been necessary and has contributed substantially to the production cost thereof.

This invention may be variously modified and embodied within the scope of the subjoined claims.

What is claimed is:

1. A lightweight, compact, electric motor driven unit for a portable hand tool operable selectively from high voltage line power and low voltage battery power comprising a stator having poles to generate a magnetic field, a rotor comprising a shaft having a single armature thereon, a low voltage winding on the armature, a first commutator on the shaft coupled to said low voltage winding, a high voltage winding on the armature, a second commutator on the shaft coupled to said high voltage winding, first means for coupling said battery power to said first commutator when battery operation is desired, second means for coupling said line power to said commutator when line operation is desired, and interlock means preventing application of low voltage battery power to said first commutator during the application of high voltag line power to said second commutator.

2. The power source of claim 1 in which the low voltage winding consists of a small number of turns of relatively thick wire and the high voltage winding consists of a substantially greater number of turns of relatively finer wire.

3. The power source of claim 1 in which such high voltage line power is applied there through a detachable line cord that plugs into it, and in which said interlock means includes a switch which is opened by plugging in the line cord for operation from said line power and which closes for operation from battery power when the line cord is unplugged.

4. The power source of claim 1 in which said stator comprises permanent magnets.

5. The power source of claim 1 in which said high voltage line power is an alternating current and which includes means for rectifying the alternating current to a unidirectional current.

6. The power source of claim 5 including a battery mounted in said appliance and circuit means for charging the battery from said high voltage line power.

7. The power source of claim 6 in which said battery charging circuit means includes means for dropping the high voltage of the high voltage line power to low voltage.

8. The power source of claim 7 in which said means for dropping the high voltage includes a condenser.

9. The power source of claim 6 in which said battery charging circuit means includes a means for limiting the charging current to a predetermined value.

10. The power source of claim 9 in which said means for limiting the charging current includes a resistor.

11. The power source of claim 9 in which said means for limiting the charging current includes a capacitor.

12. The power source of claim 6 in which such high voltage line power is applied thereto through a detachable line cord that plugs into it, and in which said interlock means comprises an interlock switch provided to couple the line power to said battery charging means when said line cord is plugged into said power source.

13. The power source of claim 6 which includes a selector switch operable to apply the line power to said high voltage winding, to apply said battery power to said low voltage winding, and to apply said line voltage to said battery charging means selectively.

14. A rotary power source for an applance to be operable selectively from high voltage line power or low voltage battery power comprising an electric motor having a stator and rotor, said stator being provided with field poles to generate a magnetic field, said rotor comprising a central shaft, a plurality of armature laminations assembled on said shaft and having substantilly axially extending slots in the outer periphery thereof, a first commutator mounted on said shaft, a first low voltage armature winding of heavy insulated wire wound in said armature slots and coupled to said first commutator on said shaft, a second commutator mounted on said shaft, a second high voltage armature winding of thin insulated wire wound in said slots with said first armature winding and coupled to said second commutator on said shaft, means including a first brush set for applying the low voltage battery power to said first commutator when battery operation is desired, means including a second brush set for applying the high voltage line power to said second commutator when line operation is desired, interlock means to prevent application of such low voltage battery power to said first commutator during the application of high voltage line power to said second commutator, a battery mounted in said appliance, circuit means for charging said battery from such high voltage line power, said appliance being provided with a receptacle to receive a plug carrying line power, said battery charging circuit comprising a first rectifier, a capacitor coupling said first rectifier to said receptacle and being of such impedance as to drop said line power voltage to the charge voltage level, means coupling said battery across said first rectifier, a second rectifier, and a first switch, said low voltage winding, said high voltage winding, a second rectifier and said first switch being serially coupled across said receptacle, a second switch, and an interlock switch, said low voltage winding, said second switch and said interlock switch being serially coupled across said battery, and said interlock switch being a normally closed switch opened when said line plug is inserted in said receptacle.

References Cited

UNITED STATES PATENTS

| | | | |
|---|---|---|---|
| 1,902,954 | 3/1933 | Hochfeld | 318—141 |
| 2,466,900 | 4/1949 | Knopp | 318—495 |
| 3,200,319 | 8/1965 | Tolmie | 307—66 |
| 2,677,798 | 5/1954 | Bekey | 318—442 |
| 3,311,763 | 3/1967 | Jepson et al. | 320—2 |
| 3,426,261 | 2/1969 | Wallin et al. | 318—290 |

FOREIGN PATENTS 1,052,265   6/1959   Germany.

ORIS L. RADER, Primary Examner

K. L. CROSSON, Assistant Examiner

U.S. Cl. X.R.

307—28; 310—140; 318—441, 442